April 22, 1924.
Re. 15,822
F. D. SHENK ET AL
HEADLIGHT
Original Filed Dec. 16, 1915 3 Sheets-Sheet 1
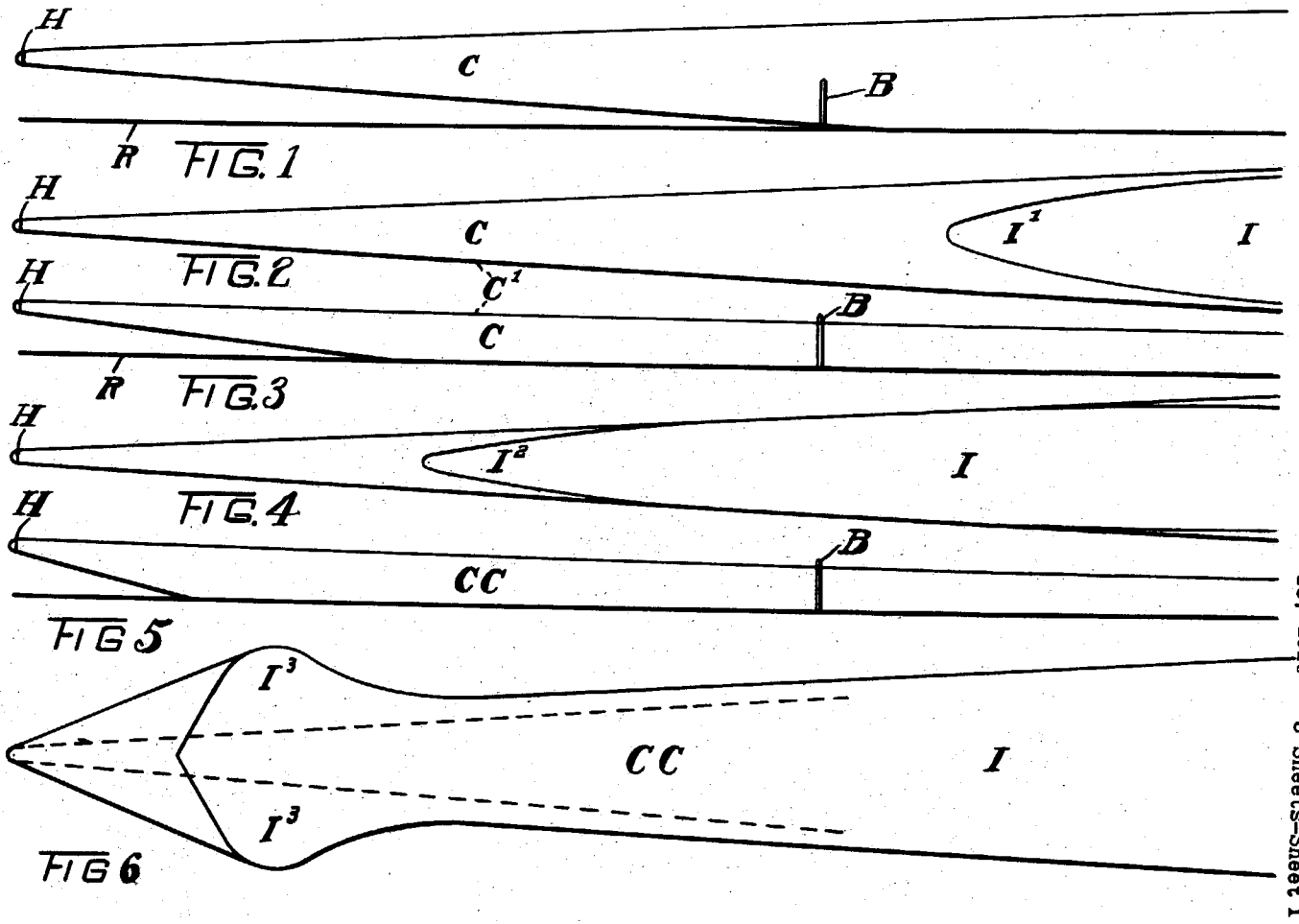
Inventors
Ralph H. Holman
Francis D. Shenk
By Chas. Spear Jr.
Attorney April 22, 1924.

F. D. SHENK ET AL

Re. 15,822

HEADLIGHT

Original Filed Dec. 16, 1915 3 Sheets-Sheet 2

Inventors
Ralph H. Holman
Francis D. Shenk
By Otis Spear
Attorney

April 22, 1924.

F. D. SHENK ET AL

Re. 15,822

HEADLIGHT

Original Filed Dec. 16, 1915 3 Sheets-Sheet 3

Inventors
Ralph H. Holman
Francis D. Shenk
By Ellis Spear Jr.
Attorney

Reissued Apr. 22, 1924. Re. 15,822

UNITED STATES PATENT OFFICE.

FRANCIS D. SHENK, OF MEDFORD, AND RALPH H. HOLMAN, OF WELLESLEY HILLS, MASSACHUSETTS, ASSIGNORS TO EDWARD N. GODING, TRUSTEE, OF NEWTON, MASSACHUSETTS.

HEADLIGHT.

Original No. 1,224,421, dated May 1, 1917, Serial No. 67,105, filed December 16, 1915. Application for reissue filed December 29, 1920. Serial No. 433,953.

*To all whom it may concern:*

Be it known that we, FRANCIS D. SHENK and RALPH H. HOLMAN, citizens of the United States, residing at Medford, county of Middlesex, Commonwealth of Massachusetts, and Wellesley Hills, county of Norfolk, and Commonwealth of Massachusetts, respectively, have invented certain new and useful Improvements in Headlights, of which the following is a specification.

This invention relates to headlights for automobiles and the like, and particularly to the illumination of that field or area within which the attention of a driver is required and into which the driver of an approaching car or a pedestrian may be compelled to enter.

The requirements as to elimination of glare raise certain difficulties in addition to those already recognized, which will be more fully discussed hereinafter, and to overcome which our invention is directed.

Our present invention contemplates a device which will in a simple and inexpensive form fulfill all these imposed conditions as to glare without sacrificing any material part of the illuminative efficiency of the headlight, so that not only the road itself, but the space at each side of the car as well will be fully illuminated in order to avoid accidents caused by the sudden stepping of pedestrians from the curb or the protruding of obstructions from the side.

Before going into any description of structure it may be remarked that the problem of overcoming glare involves an existing condition. That is to say, the difficulty must be corrected for headlight constructions already in existence as well as for those of the future.

First, the usual headlight reflector or lens, while intended to give rays truly parallel, lacks sufficient perfection to actually accomplish this result. Furthermore, the usual source of light which is now an incandescent bulb is not only of course greater than the theoretical focal point but varies in different makes of lamp, some filaments being more transverse and some more longitudinal. All this goes to prevent an absolutely true focus. The usual result is a conical sheaf with more or less errant rays according to circumstances of lamp, reflector and focus. The best results are predicated on good focus and it will be understood that the disclosure herein is based on the best original focus of the lamps possible under the individual conditions.

The light from a usual source placed in the focus of a parabolic reflector or simple mirror of a headlight is sent forward in a slightly diverging cone of light with its axis directly level with the road surface. Where this surface intersects the cone of light lies the illuminated area available for seeing the roadway. This obviously takes the form of the conic section, commonly a long parabola.

In order to avoid dazzling the observer various schemes have been devised. The simple manner is to deflect the light below the eye of the average observer. By doing this at any point in front of the headlight, the cone of rays must be depressed so that this upper portion will be below the line of sight in order that its upper limit shall be practically horizontal.

The effect of this is to cause the lower margin of the cone to intersect the road surface at a point considerably nearer the headlight than before, and to produce on the roadway a long, illuminated surface relatively parabolic of which the nearer portion of the intercept is exceedingly bright in accordance with the law of light intensity with the variation of the distance, and the remote portion increasingly darker. Between the bright point of the illuminated surface and the headlight will lie a badly lighted section of greater importance both independently and relatively. In other words, the contrast between an excessive illumination some distance ahead of the car and an illuminated or dark space immediately in front of the car is an element of danger.

The purpose of our improvement is to effect the redistribution of light emerging from the headlight so that its projection on the roadway shall be as nearly uniform in distribution as conditions will permit. To this end, we provide means to avoid glare by depressing the cone of rays through the necessary angle, in practice about half its angular diameter, and in such condition that such added means redistribute the light in the cone of rays so that its projection shall reach the required distribution.

Preferably, we employ for depressing the rays a set of parallel depressing prisms arranged somewhat as in the familiar prismatic glass used for windows but proportioned to deflect the cone of rays downward through a specific angle.

These depressor prisms tip down the entire cone of light below the required point. In addition to this we employ independently or in consolidation distributing prisms to correct the misplacement of the illumination of the light cast on the roadway by the depressed cone. Such distributing prisms may deflect part of the light so that it will fall upon the roadway between the principal intersections of the cone and the vehicle itself. Another portion of the light may be deflected nearer the horizontal than its normal projection so as to give increased illumination at points distant from the headlight. Still other portions may be deflected laterally to progressively comb out or widen the beam upon the roadway either near the headlight or at some predetermined distance therefrom.

The distributing prisms may be on that side of the screen opposite the depressing prisms, or their angles may merely be added to the depressing prisms themselves so that some or all of these will have their angles augmented or decreased by the amount necessary to give a proper redistribution. Likewise, the prisms added to secure lateral distribution may be independently formed on the external or internal face of the refracting screen in such place and of such area as to produce the desired result.

We prefer to meet the simple ordinary requirements of redistribution to obtain a vertical redistribution by augmenting the angles of the depressing prisms to such an extent as should be necessary and obtain horizontal redistribution by forming prismatic phases with vertical axes on the front of the reversing screen or even by providing a front with a general curvature to a vertical axis.

Thus the whole construction has two functions, first, the depression of the rays, and second, the redistribution, which functions may be made by two entirely distinct sets of prismatic elements or by combination as may be desirable.

To carry out these requirements, we provide first, depressing prisms, which may be independent or combined as convenience dictates with the other prismatic elements. Second, prisms designed to take light from that point which has become relatively over illuminated on account of the depression of the parabolic light area of the light cone and its change of intercept, and to draw it backward toward the headlight to eliminate the otherwise dark space between the contact of the lower edge of the depressed cone of light with the road level and the headlight. Third, prisms adapted to withdraw light from the too bright portion of the lighted area existing as above described and to shift it nearer the horizontal so as to illuminate more brightly the distant portions of the roadway. Fourth, the prisms with refracting edges at right or oblique angles to those hereinbefore mentioned to deflect light from the central or brighter part of the beam progressively laterally to produce approximately uniform reflection of the beam sidewise toward the margins of the roadway.

This lateral deflection by the refraction of the vertical lateral prisms or prism equivalents produces on each side of a vertical plane which may or may not be central, immediate opposite divergence of portions of the beam which has a distributing effect which is a continuous function of its distance from the center. While the vertical cylindricity of the front face of the lens is a preferred and highly desirable specific form it will be understood that the invention is broad enough to include the prismatic equivalent as shown in Fig. 9. The principles involved in such structures are however to be sharply differentiated from the effect produced by the employment of a number of grooved flutings or vertical prisms which tend to criss-cross the rays or merely widen the beam by opposing refractions or diffusing effects.

We have thus the depressor prisms and in addition three types of redistributing prisms, the angles of which are designed to produce the three specified results.

It should thus be understood that any of these prismatic elements may be replaced by equivalent lenticular elements, as convenience of design may dictate, without departing from the spirit of our invention.

In the accompanying drawings we have illustrated both the conditions which must be coped with and the means by which we overcome the difficulties incident to the requirements of glare elimination, while improving the general resultant illumination. The drawings relating to the former are necessarily diagrammatic, and the views treating the latter show embodiments which are both illustrative of the principles of our invention and practical embodiments capable of producing the practical results indicated as desirable.

Fig. 1 is a diagrammatic side view of the ordinary slightly divergent beam from the usual headlight.

Fig. 2 is a plan view of the same showing its intercept with the road level.

Fig. 3 is a view similar to Fig. 1 with the conical beam depressed.

Fig. 4 is a plan view of the beam shown in Fig. 3 showing the proximity of its intercept to the headlight.

Fig. 5 is a diagrammatic side view of the beam from a headlight embodying our invention.

Fig. 6 is a plan view of the beam shown in Fig. 5 and illustrating its field of illumination or intercept with the roadway.

Figure 10:
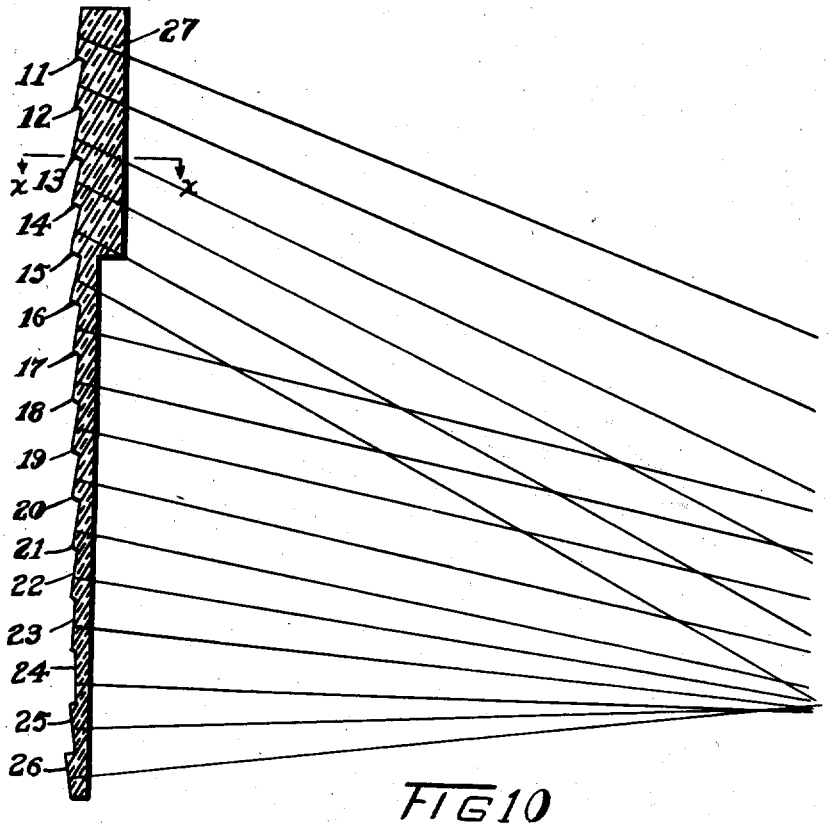
Figure 11:
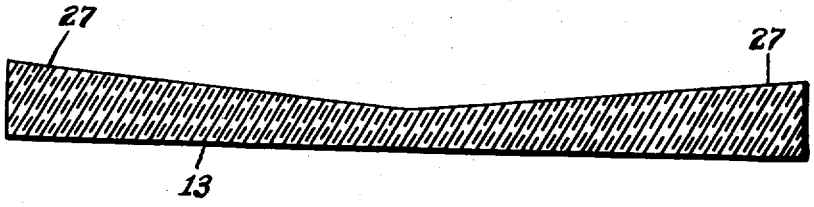

Fig. 10 is a view of refracting screen embodying our invention, with the several classes of prisms and their effects clearly differentiataed, i. e., the depression prisms, the augmented prisms to deflect light near the car, the decreased prisms to diminish the depression (which decrease may annul or reverse the depression prisms) and finally the laterally deviating prisms to widen the beam, and Fig. 11 is a section on the line $x$—$x$ of Fig. 10.

Referring first to the general conditions of headlight illumination with particular reference to Figs. 1 to 6 inclusive, it will be noted that the beam cast from the headlight H is of general conical form and as usually the case has its axis substantially parallel with the line of the roadway at R. At a distance of say 50 feet from the car indicated in the diagram by a barrier B, the eye of an observer placed at 42 inches from the ground would be approximately in the axis of the light cone. This distance of 42 inches is mentioned as that usually set by highway commissions as about the fair minimum of the eye level of the pedestrian. The distance of 50 feet between the headlight H and the barrier B is mentioned as illustrative of about that arbitrary distance beyond which the presence of any glaring rays at the eye level is most dangerous and most annoying it being understood that as approaching cars near each other in passing, the eyes of the driver tend to pass beyond the cone of illumination.

In Fig. 2 which is a plan view, the intercept of the light cone with the roadway is indicated by the parabola I of which the brightest part is the portion $I^1$.

In Figs. 3 and 4, the light cone C is illustrated as depressed so that its upper margin $C^1$ is below the level of the top of the barrier B. This brings the intercept I nearer to the headlight H so that the nearer portion of the intercept has a portion $I^2$ of much greater brightness. The brightness of the illumination at $I^2$ is of course inversely as the square of the distance along the axis, but proportionately it appears even brighter on account of its intensity relative to the more nearly dark or unilluminated roadway immediately in front of the car. Conversely the portion in front of the car appears much darker in relation to this excessively bright area $I^2$. Again the portions of the intercept I ahead of the area $I^2$ are relatively darker or less illuminated. This relative unevenness of distribution of illumination is a serious factor and is perhaps one reason why headlights have been set with the axis of the light cone parallel with the road with the resultant glare which has become such a menace to night travel as to invoke rules and laws against it. It is the object of our invention to overcome these difficulties by means which will be described and disclosed hereinafter.

These means involve initial depression of the light of the vehicle lamp, and a redistribution of one or more parts of the light in such manner as to overcome the difficulties above enumerated. In Fig. 6 we have shown a diagrammatic side view of a light cone CC depressed as in Figs. 3 and 4, but modified in different parts thereof so that the portion $I^2$ of over-illumination in Fig. 4 shall be dispersed, part of it being drawn backward or downward to form lateral areas $I^3$ of reasonable brightness to show the sides of the road and also to so modify the forward portions of the intercept as to give an increase of illumination beyond the barrier B and well up to a distance of say 150 feet from the headlight at which point sufficient light is desired to show clearly any car or pedestrian or obstruction in the road.

Figure 7:
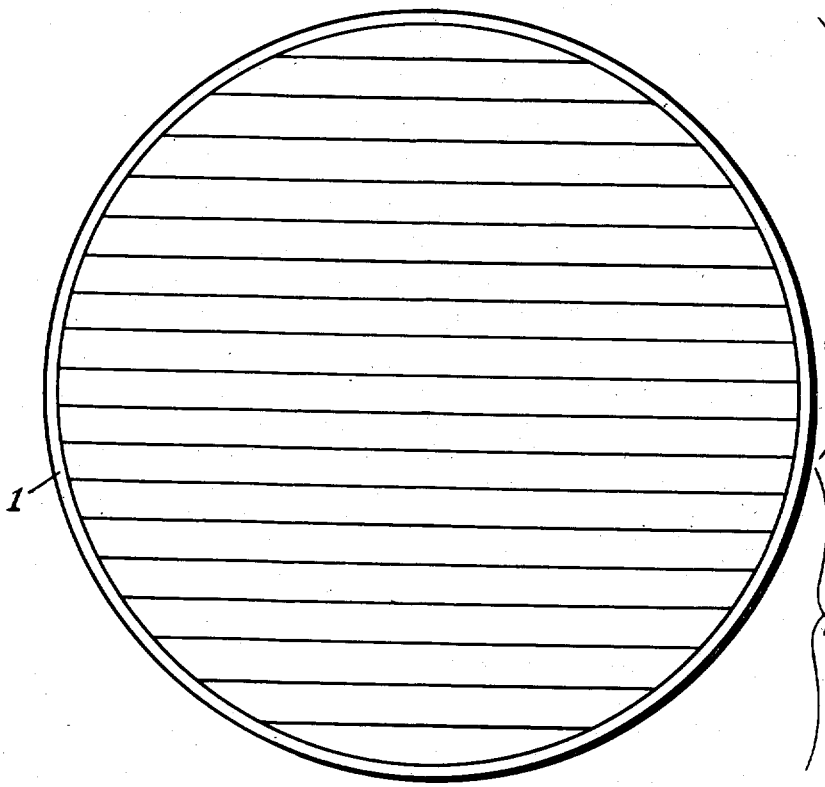
Fig. 7 is a rear elevation of a light screen or plate in accordance with our invention.
Figure 8:
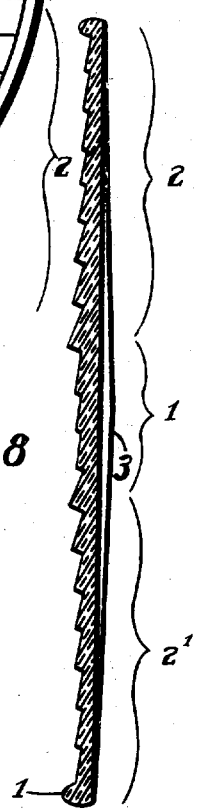
Fig. 8 is a central sectional view thereof.

Coming now to the means by which we effect the result, reference is made to the embodiment shown in Figs. 7 and 8. As appears in Fig. 7, our invention may have one form of embodiment as a plate or screen of glass adapted to be substituted for the usual glass headlight front. This plate of the form shown consists of a disk crossed on its rear face by transverse prismatic ribs of variant angularity, and in the embodiment shown having on its front face lateral vertical elements formed by a cylindrical concavity on the front of the lens indicated at 3 in Figs. 8 and 9. This may be concaved as in Fig. 8 or eccentric as in Fig. 9.

It is to be understood throughout this description that we do not confine ourselves to prisms. and that where prisms are shown or described, lenticular elements may be substituted or vice versa. Neither do we limit ourselves to the exact disposition of any of these elements shown or described unless specifically claimed as such, it being understood that the arrangement or grouping of the separate elements and their relative disposition may be varied considerably without departing from the spirit of our invention.

Referring again to the embodiment illustrated in Figs. 7 and 8, it will be noted that in the form shown, the central prismatic rib and the two next adjacent are for the purposes of illustration shown as of the same angularity, and are designated as a group at 1. Above this group, in the form shown, is a group of prisms indicated at 2 of successive decreasing angularity from the center upward. Below the central group 1 is another group $2^1$ of successive decrease in angularity from the center downward. In this form, while the arrangement and gradation of the prisms are symmetrical, there is included the three classes of prisms heretofore referred to. That is to say, prisms having a sole or partial function of depressing the light rays below eye level, prisms augmented to increase this depression of rays, as well as the lateral elements, in this case lenticular rather than prismatic, which constitutes the lateral deflecting element for side illumination.

Figure 9:
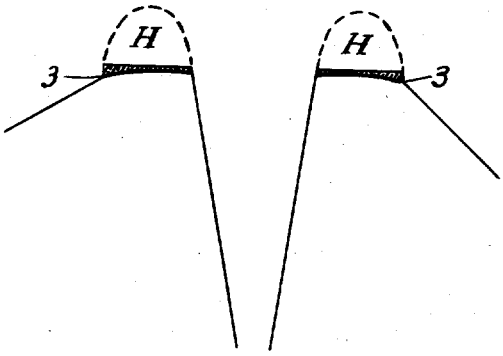
Fig. 9 is a somewhat diagrammatic view indicating the lateral divergence of lights from a pair of screens or plates on adjacent headlights.

As heretofore suggested, the function of the lateral diverging elements may be modified as illustrated in Fig. 9 where the lenses are employed in adjacent headlights as at H—H. The lateral elements of the inner edge of each may be of less divergent effect than the outer sides so that the intersection of the adjacent light cones will be free from overbrilliancy.

The supplementative relation of such a pair of lenses as H—H in Fig. 9 will be apparent by reference to the diagrammatic illustration in Fig. 6 as indicated by the diagrammatic lines in Fig. 9 and with reference to the predetermined illumination of the roadway intercept. The two lamps H—H therefore as indicated in Fig. 9 give a uni-lateral distribution with reference to the median axis of symmetry midway between and parallel to the axes of said lens or reflectors. In this feature of the element the lateral divergence of the two portions of the beam are so regulated as indicated in Fig. 9 as to supplement each other, each being combed out on the inner side of the beam so as to supplement the other in area and degree of illumination, conjugated effect where overlapping, and on the outer side supplementing each other in bringing the area of illumination of the whole to a predetermined form and relative degree of brightness.

The functions of the variant angles of the prisms may be best understood by reference to the embodiment shown in Fig. 10. In that figure, the prismatic elements have been numbered, beginning at the top, 11 to 16 inclusive. These six prisms are progressively augumented to deflect light near the vehicle. The succeeding four prisms, 17 to 20, inclusive, are normal depressor prisms merely intended to draw the beams downward to the required level. The prisms 21 to 25, inclusive, constitute a group of prisms decreased from the normal depressor prisms, the decrements being such as to tend to lift the transmitted rays toward the horizontal. In this group are shown prisms with slightly increasing decrements, as at 21 to 23, tending to permit more nearly horizontal rays. Prisms of reversed angle 25 and 26, tend still further to lift the rays toward or beyond horizontal.

It is to be noted that the face 24 is a plane surface owing to the fact that at this point the angle of decrement is the same as the angle of the normal depressor prisms. In actual practice, all or any of these forms of prisms of decreased angle may be used in any order.

In this figure also is shown a modification of the lateral deflecting elements. At 27, we have indicated oppositely faced prism elements mounted on the upper face of the screen for the purposes of securing lateral deflection of the upper part of the beams for side illumination.

We thus obtain a more useful and even distribution of light on the roadway than can be given by the simple reflecting system and obtain this with an insignificant loss in the total light flux delivered by the reflector. In all ordinary constructions of headlight a portion of the light passes directly out of the front of the reflector while the remainder is reflected and directed thereby into an approximately parallel or slightly diverging beam. Our construction is directed toward the fullest utilization of this beam, but it also tends to deflect in a generally downward way those rays which strike the refracting screen directly from the lamp without being reflected. These beams are too much scattered ordinarily to produce any unpleasant glare, but it is desirable that they be utilized as far as may be to improve the illumination on the roadway, and the generally downward deflection produced by our refracting system herein described is such as to tend toward this result.

In the foregoing discussion, we have ignored the vertical radial displacement of successively higher prisms. This difference has been apparently considered a factor heretofore in the art, but we have found that this vertical radial displacement is negligible and the increase of depressive effect of the successive deflector elements unnecessary in comparison with the general depression provided for in our invention with its combined corrective redistribution.

Various modifications in the refractive elements, their angles, disposition and combination of classes may obviously be used, all without departing from the spirit of our invention, if within the limits of the appended claims.

What we therefore claim and desire to secure by Letters Patent is:

1. A refractive screen for an automobile headlight having transverse prisms on its rear face for the downward refraction of light rays, the forward face of said prisms having a cylindrical concavity for the lateral refraction of the rays passing through the ends of the transverse prisms.

2. A refractive screen for a vehicle headlight having transverse prisms on its rear face depressed for the downward refraction of light rays, the forward face of said prisms having an eccentric cylindrical concavity for the lateral refraction of the rays passing through the ends of the transverse prisms.

3. A refractive screen for a vehicle headlight having transverse prisms on its rear face disposed for the downward refraction of light rays, the forward face of said prisms having a cylindrical concavity for the lateral refraction of the rays passing through the ends of the transverse prisms.

4. A refractive screen for use with a headlight having a reflector consisting of a plate having on one face transverse prismatic surfaces of downward refractive action on the reflected rays and having on its opposite face a surface in the path of rays so downwardly refracted, said surface being of such refractive function supplementative to that of the downwardly refractive prisms on the opposite face as to give the emerging depressed rays on one side of the axial vertical plane of the reflector a lateral refractive component to give a predetermined resultant distribution.

5. A refracting screen for a vehicle headlight comprising a transparent plate, having parallel transverse prisms extending across its rear face, the prisms on the lower portion of said plate beginning at a point adjacent the center thereof downward having decreasing refracting angles, and a front face adapted to disperse the beam laterally.

6. In a vehicle headlight in combination, a substantially parabolic reflector and a refracting screen having a plurality of horizontal prisms of varying depressant effect, and cylindrical refractive elements adapted to produce an immediate divergence of the resultant beam with respect to a vertical plane through the center of said screen.

In testimony whereof we affix our signatures in presence of two witnesses.

RALPH H. HOLMAN.
FRANCIS D. SHENK.

Witnesses:
VICTORIA COWDEN,
MARION F. WEISS.